(12) United States Patent
Nakane et al.

(10) Patent No.: US 12,264,833 B2
(45) Date of Patent: Apr. 1, 2025

(54) THERMAL LOAD ESTIMATION DEVICE, AIR CONDITIONING CONTROL SYSTEM, AND THERMAL LOAD ESTIMATION METHOD

(71) Applicant: MITSUBISHI ELECTRIC CORPORATION, Tokyo (JP)

(72) Inventors: Koki Nakane, Tokyo (JP); Toshisada Mariyama, Tokyo (JP); Mio Motodani, Tokyo (JP); Masae Sawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 349 days.

(21) Appl. No.: 17/859,624

(22) Filed: Jul. 7, 2022

(65) Prior Publication Data

US 2022/0349608 A1 Nov. 3, 2022

Related U.S. Application Data

(63) Continuation of application No. PCT/JP2020/009312, filed on Mar. 5, 2020.

(51) Int. Cl.
*G05B 99/00* (2006.01)
*F24F 11/63* (2018.01)
*G05B 19/042* (2006.01)

(52) U.S. Cl.
CPC ............ *F24F 11/63* (2018.01); *G05B 19/042* (2013.01); *G05B 2219/2614* (2013.01)

(58) Field of Classification Search
CPC ............................................. G05B 2219/2614
See application file for complete search history.

(56) References Cited

U.S. PATENT DOCUMENTS

2016/0348932 A1 12/2016 Tamaru et al.
2018/0187913 A1 7/2018 Kolk
(Continued)

FOREIGN PATENT DOCUMENTS

JP H1114119 A * 1/1999
JP 2011-214794 A 10/2011
(Continued)

OTHER PUBLICATIONS

Chinese Office Action and Search Report for Chinese Application No. 202080097277.4, dated Apr. 29, 2023, with an English translation.

(Continued)

*Primary Examiner* — Suresh Suryawanshi
(74) *Attorney, Agent, or Firm* — Birch, Stewart, Kolasch & Birch, LLP

(57) ABSTRACT

In a thermal load estimation device, a process in which a state estimating unit estimates a state amount indicating a state of a target area at an estimation target time by using measurement data obtained by measuring a state amount of the target area, air conditioner operation data indicating an operation state of an air conditioner disposed in the target area, and a thermal load of the target area estimated by a thermal load estimating unit, and a process in which the thermal load estimating unit estimates the thermal load of the target area by using the measurement data, the air conditioner operation data, and an estimation value of the state amount of the target area estimated by the state estimating unit are alternately performed, so that a thermal load likely to be the thermal load of the target area at the estimation target time is estimated.

7 Claims, 5 Drawing Sheets

(56) References Cited

U.S. PATENT DOCUMENTS

2018/0313557 A1 11/2018 Turney et al.
2019/0318047 A1* 10/2019 Kogo ..................... G06F 30/13
2020/0025402 A1* 1/2020 Bell ........................ F24F 11/64

FOREIGN PATENT DOCUMENTS

| JP | 2015-148417 A | 8/2015 |
| JP | 2015-152179 A | 8/2015 |
| JP | 6866277 B2 * | 4/2021 |
| WO | WO-2021161519 A1 * | 8/2021 |

OTHER PUBLICATIONS

International Search Report (PCT/ISA/210) issued in PCT/JP2020/009312 mailed on Jun. 2, 2020.
Written Opinion (PCT/ISA/237) issued in PCT/JP2020/009312 mailed on Jun. 2, 2020.

* cited by examiner

THERMAL LOAD ESTIMATION DEVICE, AIR CONDITIONING CONTROL SYSTEM, AND THERMAL LOAD ESTIMATION METHOD

CROSS REFERENCE TO RELATED APPLICATIONS

This application is a Continuation of PCT International Application No. PCT/JP2020/009312, filed on Mar. 5, 2020, which is hereby expressly incorporated by reference into the present application.

TECHNICAL FIELD

The present disclosure relates to a thermal load estimation device, an air conditioning control system, and a thermal load estimation method.

BACKGROUND ART

There is an air-conditioning control technique for estimating a thermal load in an air-conditioning area and controlling an air-conditioning device on the basis of the estimated thermal load. For example, Patent Literature 1 describes an air-conditioning system that calculates an estimation amount of a thermal load in an air-conditioning area, by using a thermal load calculation formula having, as a parameter, skeleton information indicating a feature of a building that is the air-conditioning area. The skeleton information is information unique to the building including, for example, a material of an outer wall, a material of an inner wall, a material of a roof, and heat insulation performance of window glass of the building, and also includes structural information such as a height of a ceiling, a width, and a depth of the building, and information related to a material and an azimuth of the window glass, a heat transmission rate of the glass, an area of the outer wall, an area of the roof, and a thickness of the wall.

CITATION LIST

Patent Literatures

Patent Literature 1: Japanese Patent Laid-Open Publication No. 2015-148417

SUMMARY OF INVENTION

Technical Problem

In the estimation of the thermal load by using the thermal load calculation formula, information unique to the target area in which the thermal load is estimated, such as skeleton information of a building, is used as a parameter. Therefore, there is a problem that the thermal load of the target area cannot be estimated unless the information unique to the target area is known or can be measured.

The present disclosure solves the above problem, and an object of the present disclosure is to obtain a thermal load estimation device, an air conditioning control system, and a thermal load estimation method capable of estimating a thermal load of a target area without using information unique to the target area.

Solution to Problem

A thermal load estimation device according to the present disclosure includes: state estimating circuitry to estimate a state amount of a target area at an estimation target time, by using measurement data obtained by measuring a state amount of the target area, air conditioner operation data indicating an operation state of an air conditioner disposed in the target area, and an estimation value of a thermal load of the target area; and thermal load estimating circuitry to estimate the thermal load of the target area at the estimation target time, by using the measurement data, the air conditioner operation data, and an estimation value of the state amount of the target area, in which the thermal load estimating circuitry estimates a plurality of thermal load candidates, calculates a likelihood of each of the thermal load candidates by using the measurement data, the air conditioner operation data, and the estimation value of the state amount of the target area, and estimates the thermal load of the target area from the plurality of thermal load candidates on a basis of the calculated likelihood, and in which a process in which the state estimating circuitry estimates the state amount of the target area by using the estimation value of the thermal load of the target area estimated by the thermal load estimating circuitry, and a process in which the thermal load estimating circuitry estimates the thermal load of the target area by using the estimation value of the state amount of the target area estimated by the state estimating circuitry are alternately performed, so that a thermal load likely to be the thermal load of the target area at the estimation target time is estimated.

Advantageous Effects of Invention

According to the present disclosure, a process in which a state estimating unit estimates a state amount indicating a state of a target area at an estimation target time by using measurement data obtained by measuring a state amount of the target area, air conditioner operation data indicating an operation state of an air conditioner disposed in the target area, and an estimation value of a thermal load of the target area estimated by a thermal load estimating unit, and a process in which the thermal load estimating unit estimates the thermal load of the target area at the estimation target time using the measurement data, the air conditioner operation data, and an estimation value of the state amount of the target area estimated by the state estimating unit are alternately performed, so that a thermal load likely to be the thermal load of the target area at the estimation target time is estimated. As a result, the thermal load estimation device according to the present disclosure can estimate the thermal load of the target area without using information unique to the target area.

DESCRIPTION OF EMBODIMENTS

First Embodiment

Figure 1:
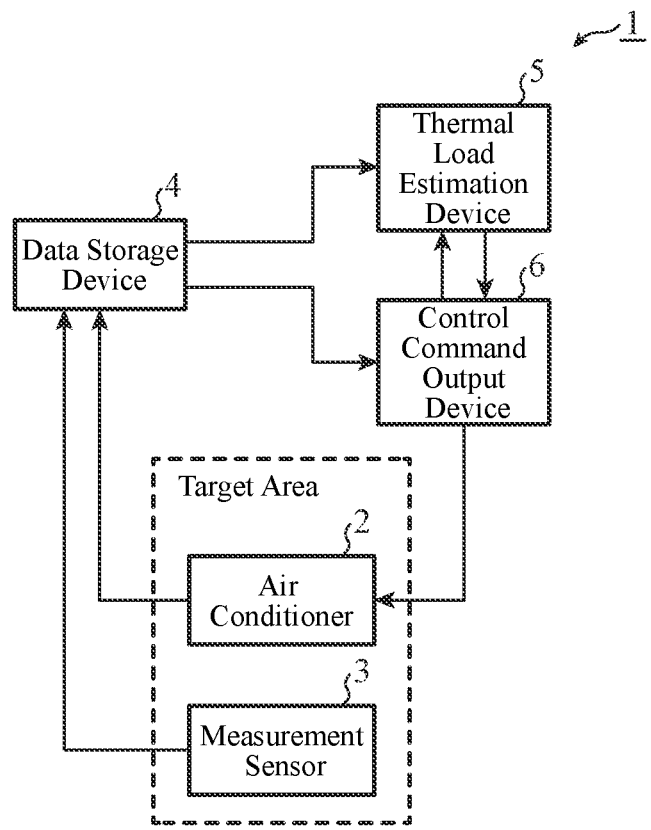
FIG. 1 is a block diagram illustrating the configuration of an air conditioning control system according to a first embodiment.

FIG. 1 is a block diagram illustrating the configuration of an air conditioning control system 1 according to a first embodiment. The air conditioning control system 1 is a system that controls air-conditioning operation of an air conditioner 2 disposed in a target area, and includes a measurement sensor 3, a data storage device 4, a thermal load estimation device 5, and a control command output device 6. For example, in the air conditioning control system 1, between the air conditioner 2 and the measurement sensor 3 and the data storage device 4, between the data storage device 4 and the thermal load estimation device 5 and the control command output device 6, between the thermal load estimation device 5 and the control command output device 6, and between the control command output device 6 and the air conditioner 2, communication connection is established in a wireless or wired manner.

The thermal load estimation device 5 and the control command output device 6 estimate a thermal load by using air conditioner operation data indicating an operation state of the air conditioner 2 and measurement data indicating a state amount indicating a temperature state in the target area, and output a control command for controlling the air-conditioning operation of the air conditioner 2. Although FIG. 1 illustrates one air conditioner 2 as an example, the air conditioning control system 1 can control a plurality of air conditioners 2.

The air conditioner operation data includes, for example, a set temperature, an air volume, an operation rate, a compressor frequency, information indicating on or off of a thermostat, a refrigerant evaporation temperature (ET), a refrigerant condensation temperature (CT), and a degree of superheating (SH) in the air conditioner 2. The air conditioner 2 outputs the air conditioner operation data to the data storage device 4.

The measurement sensor 3 includes sensors provided inside and outside the target area, and is, for example, a temperature sensor that measures room temperature, humidity, and outside air temperature. The measurement data obtained by measuring the state amount of the target area by the measurement sensor 3 is output to the data storage device 4.

The data storage device 4 stores the air conditioner operation data output from the air conditioner 2 and the measurement data measured by the measurement sensor 3. For example, the data storage device 4 stores measurement data sequentially measured by the measurement sensor 3 for each measurement time of the measurement data. The thermal load estimation device 5 and the control command output device 6 sequentially acquire the air conditioner operation data and the measurement data via the data storage device 4.

The thermal load estimation device 5 estimates the thermal load of the target area by using the air conditioner operation data and the measurement data stored in the data storage device 4. The estimation value of the thermal load estimated by the thermal load estimation device 5 is output to the control command output device 6. Note that the air conditioner operation data and the measurement data do not include information unique to the target area, such as skeleton information on the building. Even in a case where information unique to the target area is unknown and measurement thereof is impossible, the thermal load estimation device 5 can estimate the thermal load that changes from moment to moment in the target area.

The control command output device 6 estimates a control value for optimizing the air-conditioning operation in the target area, on the basis of the air conditioner operation data and the measurement data stored in the data storage device 4 and the estimation value of the state amount or the thermal load of the target area estimated by the thermal load estimation device 5.

The optimization of the air-conditioning operation is, for example, to cause the air conditioner 2 to perform the air-conditioning operation in such a way that a difference between the target value of the state amount of the target area at the measurement position of the measurement sensor 3 and the estimation value of the state amount of the target area is minimized. The control command output device 6 outputs the control command including a control value to the air conditioner 2. The air conditioner 2 performs the air-conditioning operation in accordance with the control value in the control command.

The thermal load estimation device 5 and the control command output device 6 are learned offline in such a way as to each output an optimum value depending on the state of the target area. In an inference stage where the learning is completed, the thermal load estimation device 5 estimates and outputs a likely value as the thermal load of the target area on the basis of the data acquired from the air conditioner 2 and the measurement sensor 3, and the control command output device 6 estimates the control value for the air conditioner 2 to perform the optimum air-conditioning operation on the thermal load of the target area on the basis of the data acquired from the air conditioner 2 and the measurement sensor 3 and the estimation value of the state amount or the thermal load of the target area. Note that the thermal load estimation device 5 sequentially learns the thermal load estimation in parallel with the thermal load estimation even in the inference stage.

Figure 2:
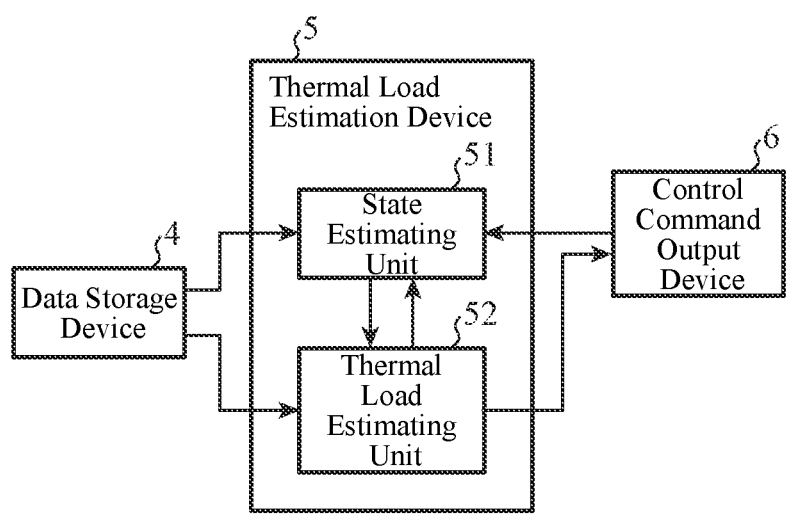
FIG. 2 is a block diagram illustrating the configuration of a thermal load estimation device according to the first embodiment.

FIG. 2 is a block diagram illustrating the configuration of the thermal load estimation device 5. As illustrated in FIG. 2, the thermal load estimation device 5 includes a state estimating unit 51 and a thermal load estimating unit 52. The state estimating unit 51 estimates the state amount of the target area at the estimation target time, by using the air conditioner operation data and the measurement data stored in the data storage device 4 and the estimation value of the thermal load of the target area estimated by the thermal load estimating unit 52.

For example, the state estimating unit 51 estimates the state amount of the target area at the estimation target time, by using a state estimation model indicating a relationship among the measurement data, the air conditioner operation data, the thermal load of the target area, and the state amount of the target area. The state estimation model is a function that receives input of the measurement data, the air conditioner operation data, and the thermal load as parameters, and calculates the state amount of the target area depending on the temporal change of these pieces of input data.

The state estimating unit 51 estimates a state amount of the target area corresponding to the control value included in the control command output from the control command output device 6. In a case where the control value is the set temperature for the air conditioner 2 and the state amount is room temperature, the state estimating unit 51 estimates the room temperature when the air conditioner 2 performs the air-conditioning operation in accordance with the control value.

The thermal load estimating unit 52 estimates the thermal load of the target area, by using the air conditioner operation data and the measurement data stored in the data storage device 4 and the estimation value of the state amount of the target area estimated by the state estimating unit 51. For example, the thermal load estimating unit 52 estimates the thermal load of the target area in such a way that a difference between the estimation value of the state amount of the target area at the estimation target time and the state amount indicated by the measurement data measured at the estimation target time is minimized.

The thermal load estimation device 5 performs learning in such a way as to estimate a likely value as the thermal load of the target area, by alternately estimating the state amount of the target area and estimating the thermal load of the target area using all the data (air conditioner operation data and measurement data) stored in the data storage device 4.

Figure 3:
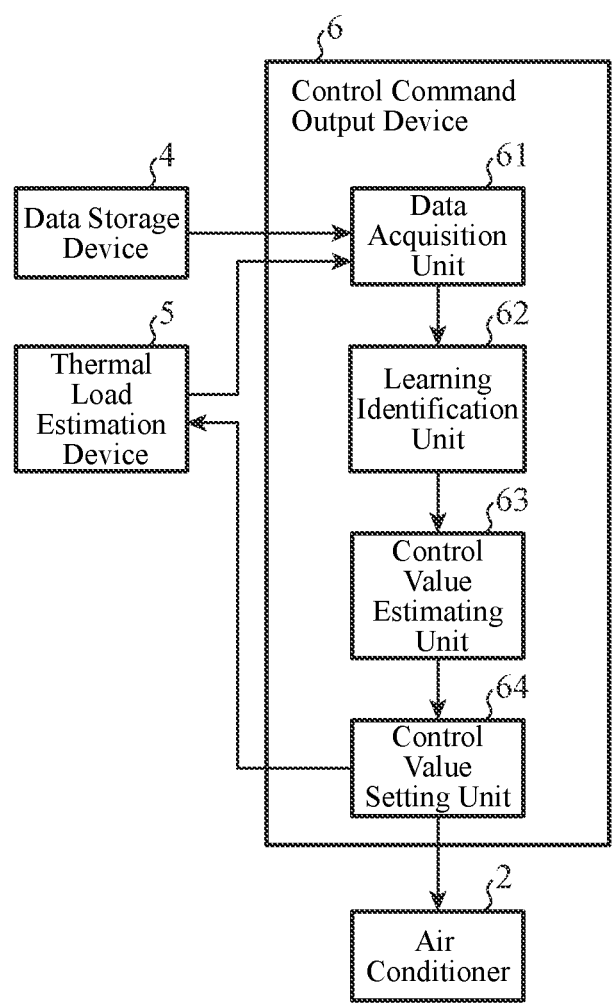
FIG. 3 is a block diagram illustrating the configuration of a control command output device in FIG. 1.

FIG. 3 is a block diagram illustrating the configuration of the control command output device 6. As illustrated in FIG. 3, the control command output device 6 includes a data acquisition unit 61, a learning identification unit 62, a control value estimating unit 63, and a control value setting unit 64. The data acquisition unit 61 sequentially acquires all the air conditioner operation data and all the measurement data stored in the data storage device 4.

The learning identification unit 62 performs learning in such a way as to estimate a control value for optimizing the air-conditioning operation for the target area using the data acquired by the data acquisition unit 61. For example, the learning identification unit 62 updates (identifies) a parameter for estimating the control value for controlling the air conditioner 2 in such a way that the state amount has a minimum difference from the target value of the state amount of the target area at the measurement position of the measurement sensor 3.

The control value estimating unit 63 estimates the control value at the estimation target time, on the basis of the parameter updated by the learning identification unit 62. For example, by using the measurement data, the air conditioner operation data, and the estimation value of the thermal load or the state amount output from the thermal load estimation device 5, the control value estimating unit 63 estimates the control value on the basis of the parameter updated by the learning identification unit 62. The control value setting unit 64 outputs, to the air conditioner 2, the control command including the control value estimated by the control value estimating unit 63, thereby setting the control value.

Figure 4:
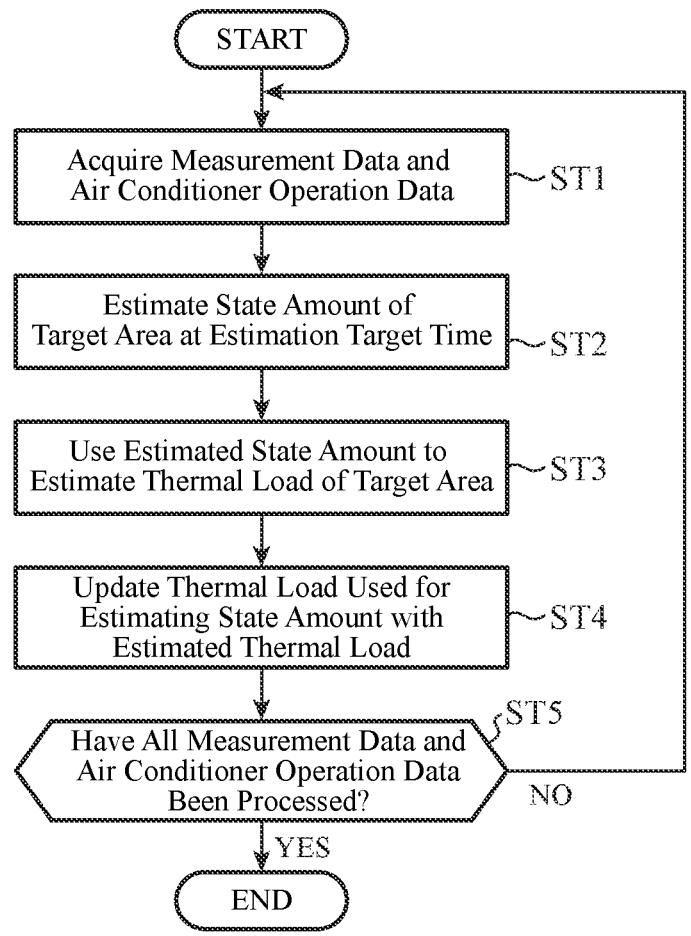
FIG. 4 is a flowchart illustrating a thermal load estimation method according to the first embodiment.

FIG. 4 is a flowchart illustrating a thermal load estimation method according to the first embodiment. A series of processes shown in FIG. 4 is learning processing of thermal load estimation when executed offline, and is thermal load estimation processing in the inference stage when executed online. In the offline learning, learning is performed using, as learning data, data accumulated in the data storage device 4 in the past. In addition, the online estimation is estimation processing using data sequentially output from the air conditioner 2 and the measurement sensor 3.

The state estimating unit 51 acquires the measurement data and the air conditioner operation data stored in the data storage device 4 (step ST1). For example, the state estimating unit 51 acquires the measurement data and the air conditioner operation data at the time t, sets, as the estimation target time, the time t+n at which n time steps have passed after the time t, and estimates the state amount of the target area at the time t+n. In the following description, it is assumed that the state amount to be estimated is the room temperature of a room that is the target area.

Subsequently, the state estimating unit 51 estimates the room temperature of the target area at the time t+n, using the measurement data, the air conditioner operation data, and the estimation value of the thermal load of the target area (step ST2). In the first time of the room temperature estimation process, since it is before the thermal load estimation by the thermal load estimating unit 52 is performed, a thermal load initial value is used as the estimation value of the thermal load of the target area. The thermal load initial value includes, for example, standard calorific values of a person and a device, and is obtained by simulation using random numbers based on a normal distribution. Moreover, in a case where a plurality of air conditioners 2 are arranged in the target area, the state estimating unit 51 estimates the room temperature for each of the air conditioners 2.

By using the measurement data and the air conditioner operation data at the time t, the state estimating unit 51 calculates the room temperature T (t+n) at the time t+n, for example, in accordance with the following formula (1). In the following formula (1), T (t) is the room temperature at time t and is included in the measurement data. The time t is a measurement time of the measurement data, and is an acquisition time of the air conditioner operation data. C is the heat capacity of the room as the target area, and $\alpha$ and $\beta$ are parameters obtained from the following formulas (2) and (3). In the following formulas (2) and (3), $R_{wall}$ is an the thermal resistance of the wall, $R_{vent}$ is the ventilation thermal resistance, and $R_{infil}$ is the draft thermal resistance. $T_{out}$ is the outside air temperature, and is included in the measurement data. $Q_{hvac}$ is the amount of heat blown out from the air conditioner 2, and is included in the air conditioner operation data. $Q_{occ}$ is a calorific value of a person, and $Q_{eqp}$ is a calorific value of a device. The thermal load estimating unit 52 estimates, as the thermal load of the room, the calorific value $Q_{occ}$ of a person, the calorific value $Q_{eqp}$ of the device, the thermal resistance $R_{wall}$ of an the wall, the ventilation thermal resistance $R_{vent}$, and the draft thermal resistance $R_{infil}$.

$$T(t+n) = T(t)c^{\frac{\alpha}{C}n} + \frac{\beta}{\alpha}\left(c^{\frac{\alpha}{C}n} - 1\right) \quad (1)$$

$$\alpha = -\frac{1}{R_{wall}} - \frac{1}{R_{vent}} - \frac{1}{R_{infil}} \quad (2)$$

$$\beta = \left(-\frac{1}{R_{wall}} - \frac{1}{R_{vent}} - \frac{1}{R_{infil}}\right)T_{out} + Q_{hvac} + Q_{occ} + Q_{eqp} \quad (3)$$

The thermal load estimating unit 52 estimates the thermal load of the target area, by using the measurement data and the air conditioner operation data at the time t and the estimation value of the room temperature at the time t+n estimated by the state estimating unit 51 (step ST3). Here, the thermal load estimating unit 52 estimates the thermal load of the target area in such a way that a difference between the estimation value of the room temperature at time t+n and the measurement data of the room temperature measured at time t+n is minimized.

For example, the thermal load estimating unit 52 functions as a particle filter that estimates a likely value as the thermal load of the target area by comparing the measurement data of the room temperature at the time t, the air conditioner operation data at the time t, and the estimation value T (t+n) of the room temperature at the time t+n output from the state estimating unit 51. In the particle filter, the probability distribution of the thermal load is expressed by a distribution of particles.

The thermal load estimating unit 52 generates a plurality of thermal load candidates by simulation using random numbers based on with Gaussian distribution. For example, 100 or more thermal load candidates are generated. Next, the thermal load estimating unit 52 updates (predicts) the distribution of the thermal load at the time t+1 in accordance with the known physical model using the plurality of thermal load candidates. Alternatively, the thermal load estimating unit 52 updates the distribution of the thermal load at the time t+1 by simulation using random numbers based on the Gaussian distribution.

The state estimating unit 51 estimates the room temperature at the time t+1, by using the measurement data of the room temperature and the air conditioner operation data at the time t and the value of the thermal load at the time t+1 updated by the thermal load estimating unit 52. The thermal load estimating unit 52 calculates, for each thermal load, the likelihood P of the corresponding thermal load at the time t+1, in accordance with the following formula (4), by using the estimation value of the thermal load at the time t+1 and the estimation value of the room temperature at the time t+1 estimated by the state estimating unit 51. In the following formula (4), $x_i$ (i=1, 2, . . . , N) is an estimation value of each thermal load at the time t+1. N is the total number of thermal load candidates. $\mu$ is the measurement data of the room temperature at the time t+1, and $\sigma^2$ is the variance of the distribution of the thermal load at the time t+1.

$$P(x_1, x_2, \ldots, x_N) = \prod_{i=1}^{N} \frac{1}{\sqrt{2\pi\sigma^2}} \exp\left(-\frac{1}{2}\frac{(x_i - \mu)^2}{\sigma^2}\right) \quad (4)$$

The thermal load estimating unit 52 extracts the maximum likelihood P from the likelihoods P of the N thermal loads calculated using the above formula (4), and determines, as the estimation value of the optimal thermal load at the time t+1, the thermal load with the maximum likelihood P. In this way, the thermal load that minimizes the difference between the estimation value of the room temperature at the time t+n and the measurement data of the room temperature measured at the time t+n is estimated. The thermal load estimating unit 52 calculates the estimation value of the optimum thermal load at each time by processing all the data stored in the data storage device 4 for each time.

Note that the case where the thermal load estimating unit 52 functions as a particle filter has been described, but a parameter search method such as a Kalman filter, an Unscented Kalman filter, grid search, or Bayesian optimization, or another machine learning method can be used for the thermal load estimation by the thermal load estimating unit 52.

The thermal load estimating unit 52 updates the parameter of the thermal load used for the estimation of the room temperature (state amount) by the state estimating unit 51 by using the estimation value of the thermal load (step ST4).

Subsequently, it is confirmed whether or not the state estimating unit 51 and the thermal load estimating unit 52 have performed the above-described processing for all the data stored in the data storage device 4 (step ST5). In a case where all the data stored in the data storage device 4 has been processed (step ST5; YES), the learning or estimation process illustrated in FIG. 4 ends. In a case where there is unprocessed data in the data stored in the data storage device 4 (step ST5; NO), the processing from step ST1 is repeated.

Figure 5:
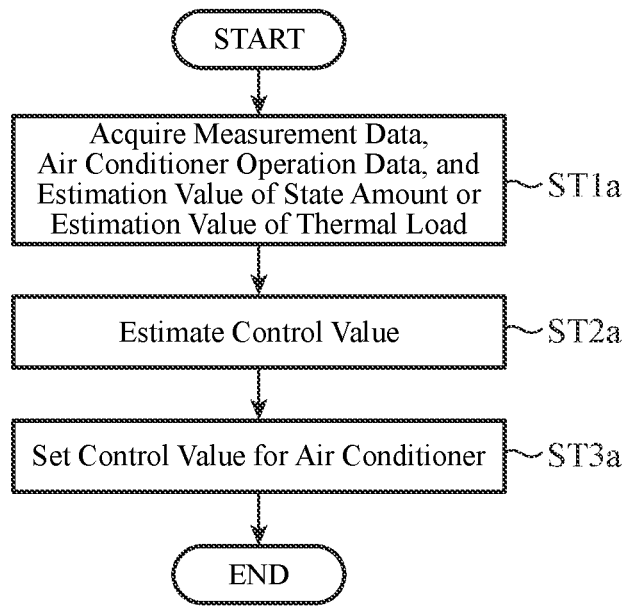
FIG. 5 is a flowchart illustrating control value estimation processing in the first embodiment.

FIG. 5 is a flowchart illustrating control value estimation processing in the first embodiment. As for a precondition of the processing illustrated in FIG. 5, it is assumed that the thermal load estimation device 5 has completed learning of thermal load estimation. Moreover, it is assumed that the learning identification unit 62 included in the control command output device 6 is learned in such a way as to estimate a control value for optimizing the air-conditioning operation for the target area.

The data acquisition unit 61 included in the control command output device 6 acquires the measurement data and the air conditioner operation data from the data storage device 4, and acquires the estimation value of the thermal load or the state amount from the thermal load estimation device 5 (step ST1a). Subsequently, by using the measurement data, the air conditioner operation data, and the estimation value of the thermal load or the state amount acquired by the data acquisition unit 61, the control value estimating unit 63 estimates the control value on the basis of the parameter updated by the learning identification unit 62 (step ST2a). The control value setting unit 64 outputs, to the air conditioner 2, the control command including the control value estimated by the control value estimating unit 63, thereby setting the control value (step ST3a).

Figure 6:
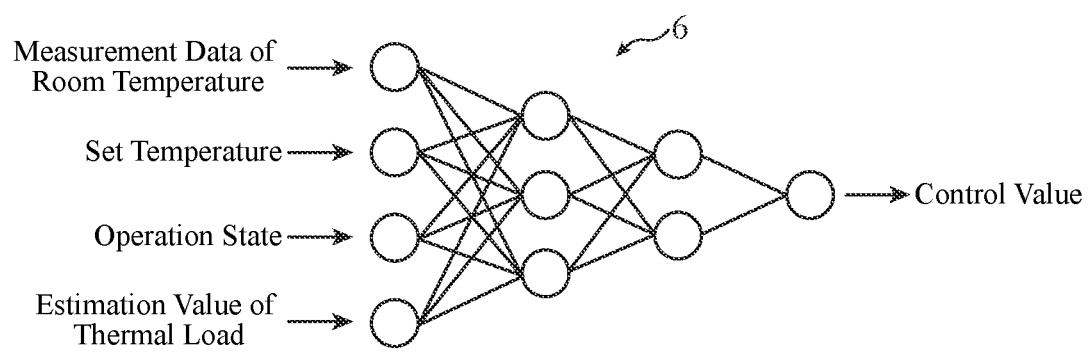
FIG. 6 is an explanatory diagram illustrating an outline of a neural network included in the control command output device.

FIG. 6 is an explanatory diagram illustrating an outline of a neural network included in the control command output device 6. The neural network illustrated in FIG. 6 functions as the control value estimating unit 63. Moreover, in this neural network, a weighting factor of each node is updated by the learning identification unit 62 in such a way as to estimate the set temperature (control value) for controlling the air conditioner 2 in such a way that the room temperature (state amount) is a room temperature (state amount) at which a difference from the target temperature (target value of state amount) of the target area at the measurement position of the measurement sensor 3 is minimum. In the inference stage, the neural network illustrated in FIG. 6 receives input of the measurement data of the room temperature, the set temperature and the operation state which are the air conditioner operation data, and the estimation value of the thermal load estimated by the thermal load estimation device 5, and estimates the set temperature (control value) for controlling the air conditioner 2.

Figure 7:
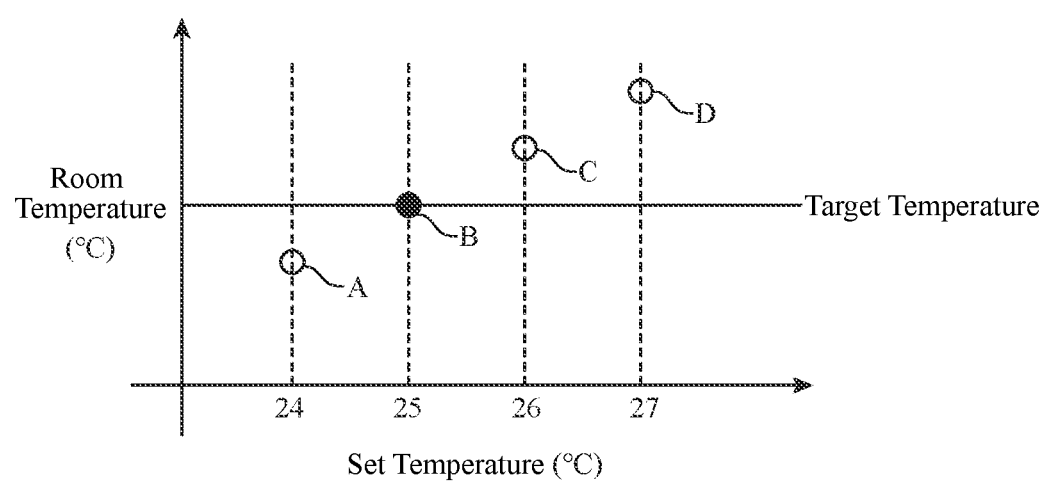
FIG. 7 is an explanatory diagram illustrating an outline of a control value estimation method by grid search.

FIG. 7 is an explanatory diagram illustrating an outline of a control value estimating method by grid search. For example, as shown in FIG. 7, an upper limit value (27° C.) and a lower limit value (24° C.) are set as the set temperature (control value). The control value estimating unit 63 outputs temperatures of 24° C., 25° C., 26° C., and 27° C. which are all possible set temperature candidates (control value candidates) of the set temperature (control value), to the thermal load estimation device 5. The state estimating unit 51 included in the thermal load estimation device 5 estimates a room temperature candidate (state amount candidate) for each set temperature.

The control value estimating unit 63 plots the estimation values A to D of the room temperature candidates in a case where the air conditioner 2 performs the air-conditioning operation at each set temperature estimated by the state estimating unit 51, in a graph illustrating the relationship between the set temperature (control value) and the room temperature (estimation value of the state amount) illustrated in FIG. 7. The control value estimating unit 63 refers to the relationship between the set temperature and the room temperature in the graph, and compares, using an error function for square error, how close to the target temperature (target value of state amount) at the measurement position of the measurement sensor 3 the estimation value of the room temperature in a case where the air conditioner 2 is air-conditioned at any set temperature is. As a result, the control value estimating unit 63 extracts, as the estimation result, the set temperature (plot B) having the smallest error. The control value setting unit 64 outputs, to the air conditioner 2, the control command including the set temperature estimated by the control value estimating unit 63, thereby setting.

The functions of the state estimating unit 51 and the thermal load estimating unit 52 in the thermal load estimation device 5 are implemented by a processing circuit. That is, the thermal load estimation device 5 includes a processing circuit that executes processing from step ST1 to step ST5 in FIG. 4. The processing circuit may be dedicated hardware, or a central processing unit (CPU) that executes a program stored in a memory.

Figure 8A:
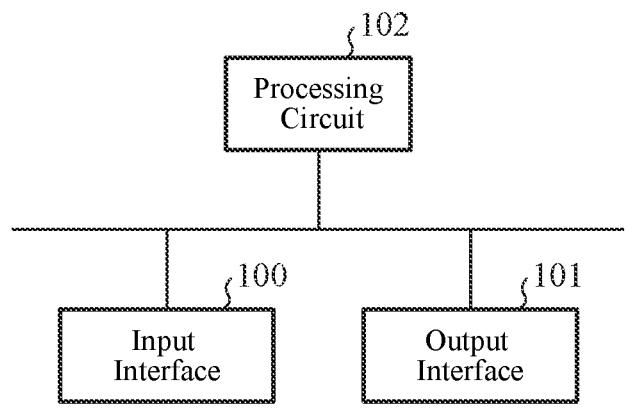
FIG. 8A is a block diagram illustrating the hardware configuration for implementing the functions of the thermal load estimation device according to the first embodiment.
Figure 8B:
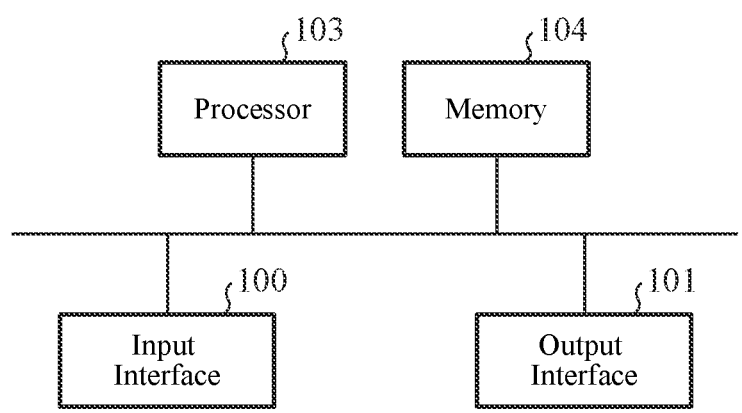
FIG. 8B is a block diagram illustrating the hardware configuration for executing software for implementing the functions of the thermal load estimation device according to the first embodiment.

FIG. 8A is a block diagram illustrating the hardware configuration for implementing the functions of the thermal load estimation device 5, and FIG. 8B is a block diagram illustrating the hardware configuration for executing software for implementing the functions of the thermal load estimation device 5. In FIGS. 8A and 8B, the input interface 100 relays the measurement data and the air conditioner operation data output from the data storage device 4 to the thermal load estimation device 5, or the control command output from the control command output device 6 to the thermal load estimation device 5. The output interface 101 relays the estimation value of the thermal load or the state amount output from the thermal load estimation device 5 to the control command output device 6.

In a case where the processing circuit is the processing circuit 102 of dedicated hardware illustrated in FIG. 8A, the processing circuit 102 corresponds to, for example, a single circuit, a composite circuit, a programmed processor, a parallel programmed processor, an application specific integrated circuit (ASIC), a field-programmable gate array (FPGA), or a combination thereof. The functions of the state estimating unit 51 and the thermal load estimating unit 52 in the thermal load estimation device 5 may be implemented by separate processing circuits, or these functions may be collectively implemented by one processing circuit.

In a case where the processing circuit is a processor 103 illustrated in FIG. 8B, the functions of the state estimating unit 51 and the thermal load estimating unit 52 in the thermal load estimation device 5 are implemented by software, firmware, or a combination of software and firmware. Note that the software or firmware is described as programs and stored in a memory 104.

The processor 103 reads out and executes the programs stored in the memory 104, thereby implementing the functions of the state estimating unit 51 and the thermal load estimating unit 52 in the thermal load estimation device 5. For example, the thermal load estimation device 5 includes the memory 104 for storing programs that when executed by the processor 103, result in execution of the processing from step ST1 to step ST5 in the flowchart illustrated in FIG. 4. These programs cause a computer to execute procedures or methods performed by the state estimating unit 51 and the thermal load estimating unit 52. The memory 104 may be a computer-readable storage medium storing programs for causing a computer to function as the state estimating unit 51 and the thermal load estimating unit 52.

The memory 104 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a DVD.

A part of the functions of the state estimating unit 51 and the thermal load estimating unit 52 in the thermal load estimation device 5 may be implemented by dedicated hardware, and a part thereof may be implemented by software or firmware. For example, the function of the state estimating unit 51 is implemented by the processing circuit 102 that is dedicated hardware, and the function of the thermal load estimating unit 52 is implemented by the processor 103 reading out and executing a program stored in the memory 104. As described above, the processing circuit can implement the above functions by hardware, software, firmware, or a combination thereof.

As described above, in the thermal load estimation device 5 according to the first embodiment, the process in which the state estimating unit 51 estimates the state amount of the target area at the estimation target time using the measurement data, the air conditioner operation data, and the estimation value of the thermal load estimated by the thermal load estimating unit 52, and the process in which the thermal load estimating unit 52 estimates the thermal load of the target area at the estimation target time using the measurement data, the air conditioner operation data, and the estimation value of the state amount estimated by the state estimating unit 51 are alternately performed, so that the thermal load likely to be the thermal load of the target area at the estimation target time is estimated. Accordingly, the thermal load estimation device 5 can estimate the thermal load of the target area without using information unique to the target area.

Note that any component of the embodiment can be modified or any component of the embodiment can be omitted.

INDUSTRIAL APPLICABILITY

The thermal load estimation device according to the present disclosure can be used in, for example, an air conditioning control system that controls an air conditioner.

REFERENCE SIGNS LIST

1: air conditioning control system, 2: air conditioner, 3: measurement sensor, 4: data storage device, 5: thermal load estimation device, 6: control command output device, 51: state estimating unit, 52: thermal load estimating unit, 61: data acquisition unit, 62: learning identification unit, 63: control value estimating unit, 64: control value setting unit, 100: input interface, 101: output interface, 102: processing circuit, 103: processor, 104: memory

The invention claimed is:

1. A thermal load estimation device comprising:
state estimating circuitry to estimate a state amount of a target area at an estimation target time by using measurement data obtained, by measuring a state amount of the target area, air conditioner operation data indicating an operation state of an air conditioner disposed in the target area, and an estimation value of a thermal load of the target area; and thermal load estimating circuitry to estimate the thermal load of the target area at the estimation target time, by using the measurement data, the air conditioner operation data, and an estimation value of the state amount of the target area, wherein the thermal load estimating circuitry estimates a plurality of thermal load candidates corresponding to values of thermal loads as the thermal load of the target area, calculates a likelihood of each of the thermal load candidates by using the measurement data, the air conditioner operation data, and the estimation value of the state amount of the target area, and estimates the thermal load of the target area from the plurality of thermal load candidates on a basis of the calculated likelihood, and wherein a process in which the state estimating circuitry estimates the state amount of the target area by using the estimation value of the thermal load of the target area estimated by the thermal load estimating circuitry, and a process in which the thermal load estimating circuitry estimates the thermal load of the target area by using the estimation value of the state amount of the target area estimated by the state estimating circuitry are alternately performed, so that a thermal load likely to be the thermal load of the target area at the estimation target time is estimated.

2. The thermal load estimation device according to claim 1, wherein the thermal load estimating circuitry estimates the thermal load of the target area in such a way that a difference between the estimation value of the state amount of the target area at the estimation target time and the state amount indicated by the measurement data measured at the estimation target time is minimized.

3. The thermal load estimation device according to claim 1, wherein the state estimating circuitry estimates the state amount of the target area at the estimation target time, by using a state estimation model indicating a relationship among the measurement data, the air conditioner operation data, the thermal load of the target area, and the state amount of the target area.

4. An air conditioning control system comprising:

the thermal load estimation device according to claim 1; and a control command output device to estimate a control value for an operation state of the air conditioner by using the measurement data, the air conditioner operation data, and the estimation value of the state amount of the target area estimated by the state estimating circuitry or the estimation value of the thermal load of the target area estimated by the thermal load estimating circuitry, and to set the control value in the air conditioner.

5. The air conditioning control system according to claim 4, wherein the state estimating circuitry estimates a plurality of state amount candidates of the target area corresponding to a plurality of control value candidates estimated by the control command output device, and the control command output device identifies, from the plurality of state amount candidates estimated by the state estimating circuitry, a state amount candidate having a minimum difference from a target value of the state amount of the target area, and sets, from the plurality of control value candidates, the control value candidate corresponding to the identified state amount candidate, as an estimation result, in the air conditioner.

6. The air conditioning control system according to claim 4, wherein the control command output device estimates the control value at the estimation target time, by using a neural network to receive input of the measurement data, the air conditioner operation data, and the estimation value of the thermal load of the target area and to output the control value.

7. A thermal load estimation method comprising:

estimating a state amount of a target area at an estimation target time, by using measurement data obtained by measuring a state amount of the target area, air conditioner operation data indicating an operation state of an air conditioner disposed in the target area, and an estimation value of a thermal load of the target area; and estimating the thermal load of the target area, by using the measurement data, the air conditioner operation data, and an estimation value of the state amount of the target area, wherein a plurality of thermal load candidates is estimated as the thermal load of the target area, the plurality of thermal load candidates corresponding to values of thermal loads for the target area, a likelihood of each of the thermal load candidates is calculated by using the measurement data, the air conditioner operation data, and the estimation value of the state amount of the target area, and the thermal load of the target area is estimated from the plurality of thermal load candidates on a basis of the calculated likelihood, and wherein a process of estimating the state amount of the target area by using the estimation value of the thermal load of the target area, and a process of estimating the thermal load of the target area by using the estimation value of the state amount of the target area are alternately performed, so that a thermal load likely to be the thermal load of the target area at the estimation target time is estimated.

* * * * *